United States Patent [19]

Alexander

[11] Patent Number: 5,117,526

[45] Date of Patent: Jun. 2, 1992

[54] VERTICALLY STORING DOCK LEVELER

[75] Inventor: James Alexander, London, Canada

[73] Assignee: The Serco Corporation, Canada

[21] Appl. No.: 724,626

[22] Filed: Jul. 2, 1991

Related U.S. Application Data

[63] Continuation of Ser. No. 518,675, May 3, 1990, abandoned.

[51] Int. Cl.⁵ .............................................. E01D 1/00
[52] U.S. Cl. ......................................... 14/71.7; 14/71.1
[58] Field of Search ............... 14/71.1, 71.3, 71.7, 14/41–42, 46–47, 32; 92/85 B; 91/396; 104/31; 105/435

[56] References Cited

U.S. PATENT DOCUMENTS

| | | | |
|---|---|---|---|
| 3,805,672 | 4/1974 | Pekrul | 92/85 B |
| 3,883,917 | 5/1975 | Alten | 14/71.3 |
| 3,974,537 | 8/1976 | Ellis et al. | 14/71.3 |
| 4,365,374 | 12/1982 | Bennett | 14/71.7 |
| 4,641,388 | 2/1987 | Bennett et al. | 14/71.7 |
| 4,651,623 | 3/1987 | Rogers | 92/85 B |
| 4,665,579 | 5/1987 | Bennett et al. | 14/71.3 |
| 4,689,846 | 9/1987 | Sherrod | 14/71.3 |
| 4,776,052 | 10/1988 | Delgado et al. | 14/71.7 |

FOREIGN PATENT DOCUMENTS 2921233 12/1980 Fed. Rep. of Germany ....... 14/71.7

Primary Examiner—Ramon S. Britts
Assistant Examiner—Nancy P. Connolly
Attorney, Agent, or Firm—Sughrue, Mion, Zinn, Macpeak & Seas

[57] ABSTRACT

A hydraulic lift bridge/leveler that is raised by an hydraulic cylinder and lowered primarily by gravity. A toggle mechanism is used to lock the bridge in a near vertical position. An auxiliary cylinder moves a lockout arm assembly to release the toggle mechanism and power the bridge downward to a point where the weight moment through the pivot point is significantly large that the bridge will lower itself by gravity. The main cylinder employs a cushion mechanism that decelerates the bridge by slowly increasing hydraulic pressure in the cylinder. This allows the bridge to be raised at an initially high rate of speed and then slowed down near the end of travel at a near vertical position.

17 Claims, 4 Drawing Sheets

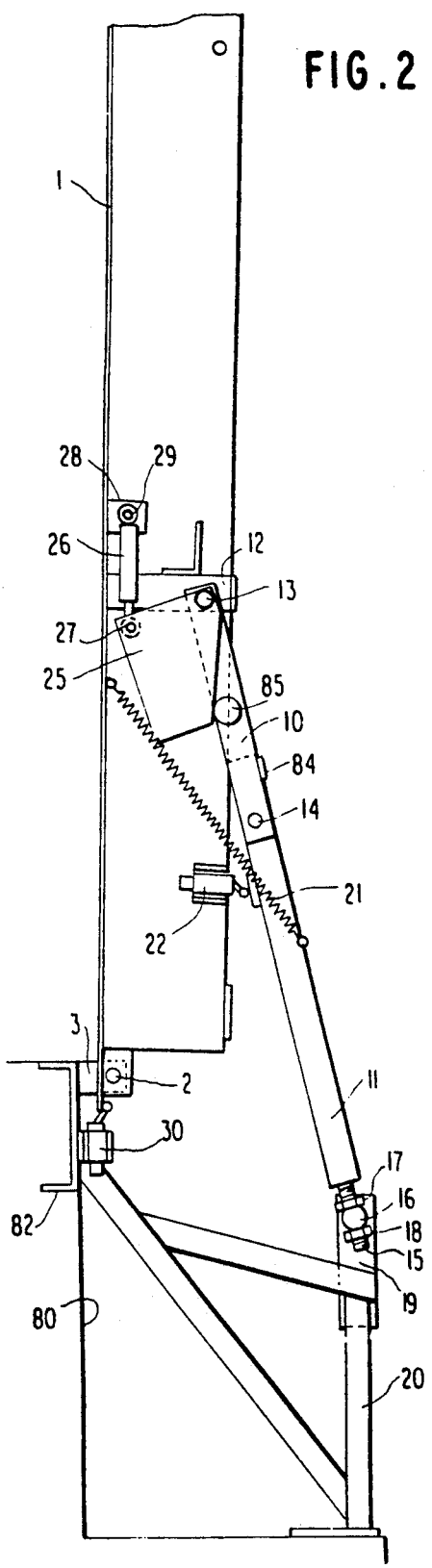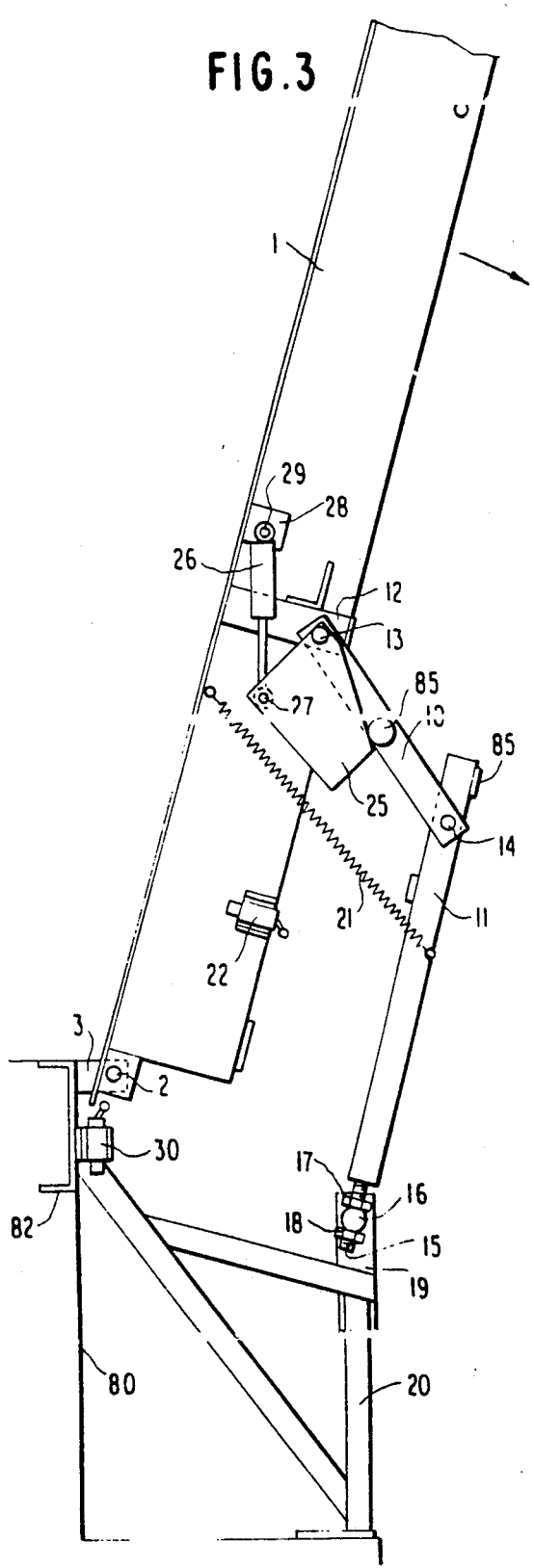

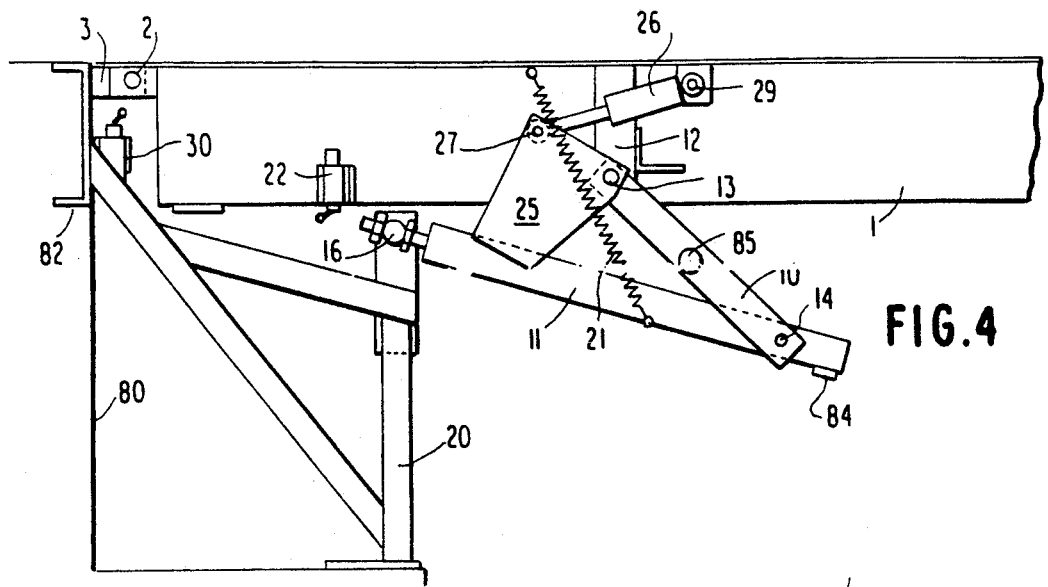
FIG.4
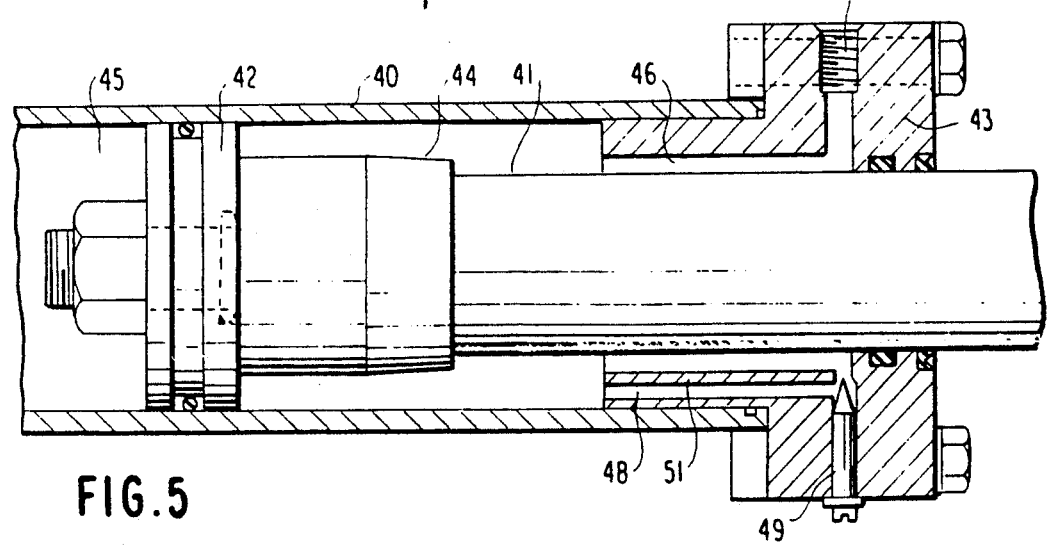
FIG.5
FIG.6
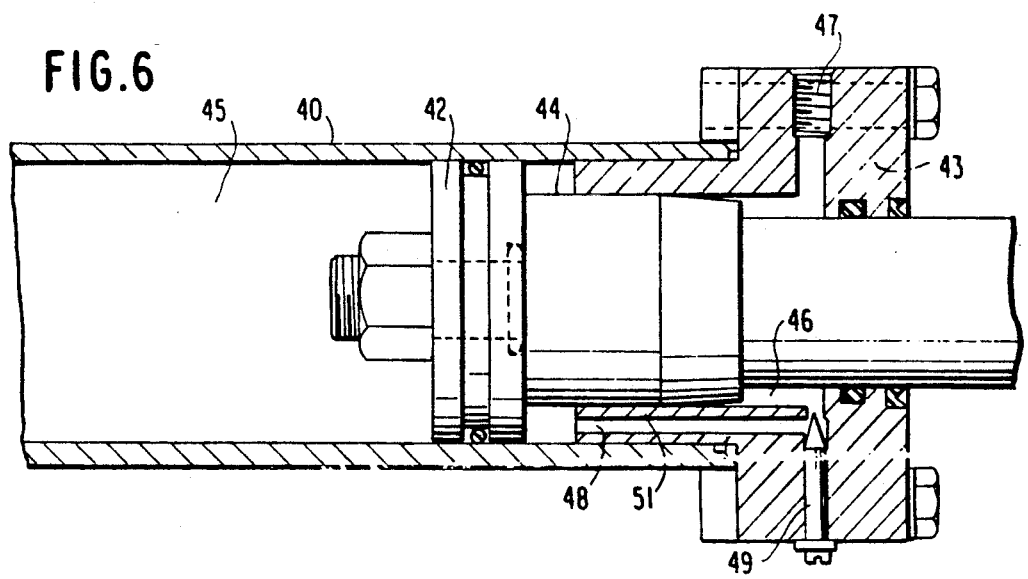

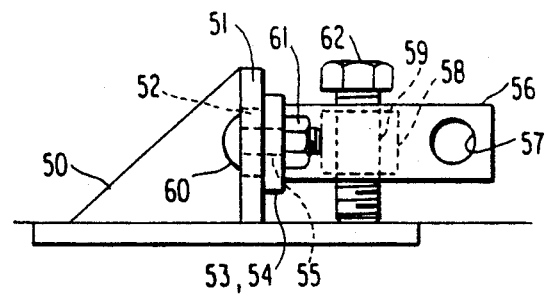
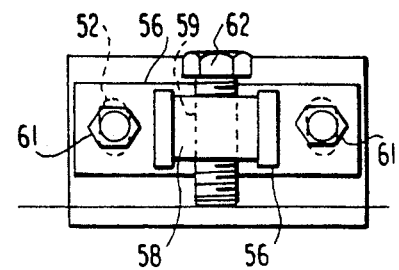
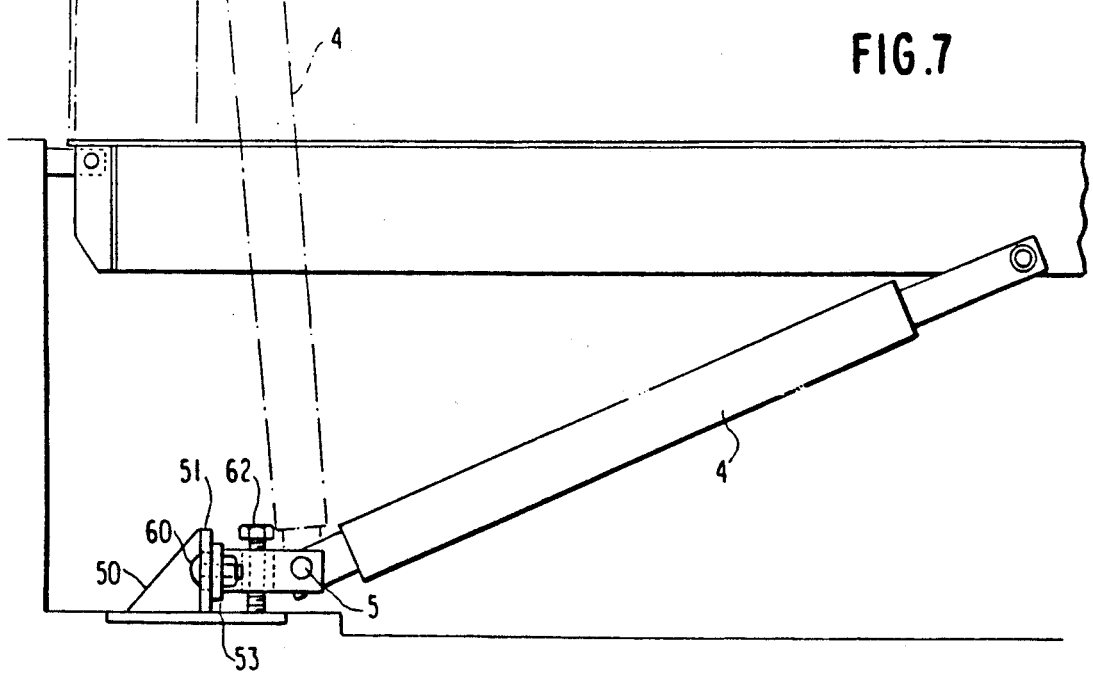

VERTICALLY STORING DOCK LEVELER

This is a continuation of application Ser. No. 07/518,675 filed May 3, 1990 now abandoned.

This invention relates to a dock leveler, and more particularly, to an improved system for raising and lowering such a device.

BACKGROUND OF THE INVENTION

Adjustable dock boards or dock levelers are adapted for installation on loading docks to span the gap between the dock and the bed of a truck or other carrier, which is in position to be loaded or unloaded. These devices have been widely used for some time and are well established in the art. Representative of patent literature which describes such devices are U.S. Patents:

U.S. Pat. No. 3,137,017—Pfleger et al;
U.S. Pat. No. 3,299,456—Dieter et al;
U.S. Pat. No. 3,368,229—Pfleger;
U.S. Pat. No. 3,530,488—Beckwitch;
U.S. Pat. No. 3,835,497—Smith;
U.S. Pat. No. 3,858,264—Kuns et al;
U.S. Pat. No. 3,877,102—Artzberger;
U.S. Pat. No. 3,995,342—Wiener;
U.S. Pat. No. 4,014,059—Artzberger et al;
U.S. Pat. No. 4,126,909—Smith et al;
U.S. Pat. No. 4,279,050—Abbott;
U.S. Pat. No. 4,328,602—Bennett;
U.S. Pat. No. 4,455,703—Fromme et al;
U.S. Pat. No. 4,619,008—Kovich et al;
U.S. Pat. No. 4,776,052—Delgato et al.

This type of device generally comprises a ramp or deck which is hingedly mounted at its rear edge to the dock. This connection can be in the form of a hinge directly to the dock or, the entire unit can be mounted in a frame, which is then set into a pit in the dock. The front edge of the deck generally has an extension lip which is hinged thereto to rest on the bed of the truck. As the truck is loaded or unloaded it tends to move vertically or "float", and the dock leveler is responsive to such movement by relative flexing between the lip and the deck.

Another type of vertically storing leveler acts as a bridge between carriers such as railroad cars. In those cases the leveler is mounted on a carriage to move laterally on a track so that the leveler can be aligned with a rail car door. It has a lip. A variation is a vertically storing lift bridge. This is pit mounted, i.e. fixed laterally, and is used to span two fixed abutments. No lip is necessary. In the application the term "bridge" will be applied to both dock levelers and bridges.

Typically, such levelers can be powered hydraulically, mechanically, electrically or the like. They are generally lowered by gravity against damping elements and then raised utilizing a power source of the type just mentioned. One of the problems associated with that mode of operation is that the rotational velocity of the leveler is not uniform and that, at the end of the movements stroke the device can violently rock or shake. Also, as a function of the geometry of the system the force necessary to raise, or lower, if done mechanically, will vary. This can be detrimental on the power system and may be a failure mode in the operation of the device.

SUMMARY OF THE INVENTION

Given these deficiencies in the prior art it is an object of this invention to provide an improved lock linkage for a lift bridge or leveler that overcomes the deficiencies of the prior art.

Yet another object of this invention is to provide an improved bridge cylinder which limits and controls the speed at which the bridge is raised and lowered.

Still another object of this invention is to provide an improved linkage which offers a powered assist to a bridge when it is being lowered, such that a more uniform speed of lowering occurs between initial actuation and the point at which gravity has a predominant effect.

These and other objects of this invention are accomplished by an hydraulic lift bridge using a toggle assembly that can be released under load and carries an arm assembly movable by an auxiliary hydraulic cylinder. In the prior art such bridges are usually lowered by gravity, however, initial movement is very slow because in a near vertical position the weight moment about the hinge point is very small. While it is conventional to give the bridge a manual push, this is not feasible with a lift bridge because of its size. Thus, those devices are customarily not stored close to vertical, which in turn presents problems. By this invention the same hydraulic cylinder which is used to release the toggle lock assembly also powers the bridge to cause rotation to a position where gravity will have a significant effect thus lowering the bridge. This hydraulic cylinder forces the arm assembly against the toggle assembly to release it and force the bridge forward. At a predetermined position, sensed by a limit switch, the hydraulic pump is turned off and the bridge falls by its own weight.

Further, during raising of the bridge, the hydraulic cylinder used to raise the bridge incorporates a main passage plug and a by-pass thus blocking and slowly bleeding off hydraulic pressure which in turn reduces the rotational speed of the bridge. This mechanism counters the effect of decreasing mount arm with the attendant increase in bridge rotational speed. The cylinder velocity is limited by the bleed-off rate through the passage. By tapering the plug the increase in hydraulic pressure can begin gradually as the plug moves to block the main fluid drain. By this technique the cylinder can be controlled to move initially at a high rate of speed then decelerate at a controlled rate to avoid abrupt stopping at the end of travel.

BRIEF DESCRIPTION OF THE DRAWINGS

FIG. 2 is a partial side view illustrating in greater detail the linkage components with the device in the vertical, stored, position:

FIG. 3 is a partial side view of the device illustrating the linkage components as the device is lowered;

FIG. 4 is a partial schematic view of the device illustrating the linkage components when the device is in its fully lowered and horizontal position;

FIG. 5 illustrates a cushioning cylinder used in conjunction with this device to control abrupt stopping motion of the leveler;

FIG. 6 is a second view of the cushioning cylinder when the device is in its vertical stored position.

FIG. 7 is a partial side view of a leveler using an alternative technique of varying the effective length of the cylinder, and FIGS. 8 and 9 are side and end views respectively of the adjustment mechanism.

DESCRIPTION OF THE PREFERRED EMBODIMENT

Figure 1:
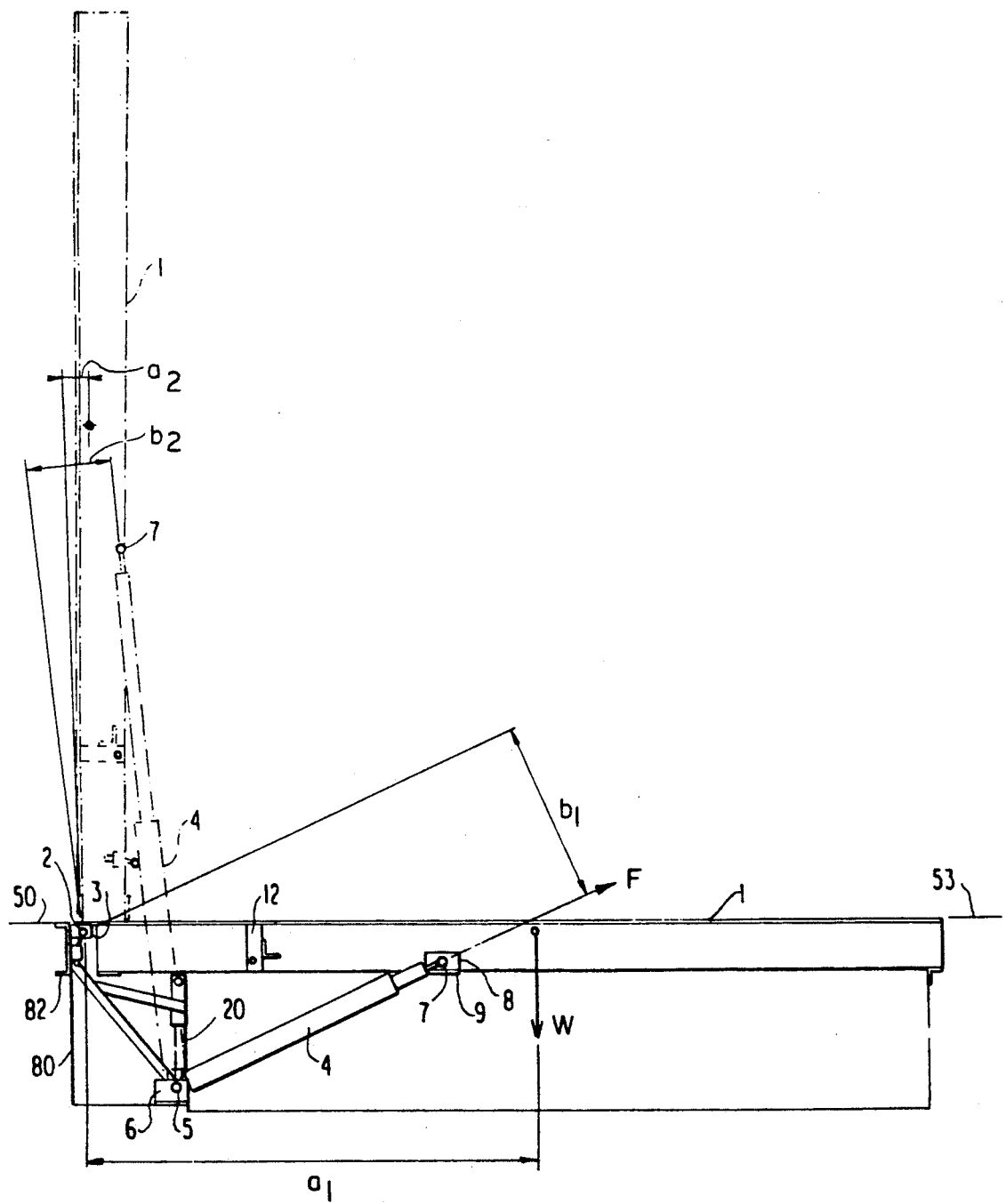
FIG. 1 is a schematic side view of a leveler-bridge device in both the raised and lowered position.

Referring now to FIG. 1, the essential elements of the leveler of this invention is depicted. It will be understood that while this description is applicable to a hydraulic lift bridge, as illustrated in the figures, the invention is equally applicable to a dock vertically stored leveler.

In FIG. 1 a bridge deck 1 is pivoted about a hinge pin 2. The hinge pin is carried on hinge blocks 3 which are affixed to a stationary dock surface, such as a vertical face 80 by means of a C-channel steel member 82, which is embedded therein. FIG. 1 illustrates the deck 1 in both the lowered horizontal position and in its raised vertical position. In the lowered horizontal position the deck extends from the loading dock 50 to an object 53 for loading or unloading thereof.

A hydraulic cylinder 4 is used to raise the bridge 1. The cylinder is pivoted at its lower end by a pin 5 carried in anchor brackets 6. The cylinder is carried at its upper end by means of a pin 7 carried in brackets 8, which are in turn attached to the lower surface of the bridge deck 1.

The cylinder has an extensible piston element, the end thereof having an adjustment attachment such as a threaded rod connected to the piston so that the effective length of the cylinder can be varied. This allows the vertical stored position of the bridge to be set accurately when the piston rod is at its full extended length, as illustrated in FIG. 1.

An alternate method to achieve the variation in length of the cylinder is to provide an adjustable mounting bracket as shown in FIGS. 7, 8 and 9. One advantage is that it allows the use of a standard fixed-length cylinder. Another is that it allows adjustment of the vertical position with minimal effect on the lowered position. This is of more importance in a vertical storing dock leveler where the lower position is determined by the retracted length of the cylinder.

As shown in FIG. 7, the device comprises a fixed bracket assembly 50 which is embedded in concrete or by some means attached to the bridge foundation. The bracket assembly includes a mounting plate 51 which has slotted holes 52. An adjustable bracket assembly 53 has a mounting flange 54 with holes 55, two side plates 56 with holes 57, and a central boss 58 with a threaded hole 59. The adjustable bracket assembly 53 is shown in greater detail by FIGS. 8 and 9. The adjustable bracket assembly 53 is attached to the fixed bracket assembly 50 by the bolts 60 and nuts 61. As shown in FIG. 7, the cylinder 4 is attached by pin 5 passing through the holes 57. The adjusting bolt 62 is inserted through the threaded hole 59.

In operation, the vertical stored position of the dock leveler can be adjusted by loosening the nuts 61 and turning the adjusting bolt 62 to raise or lower the adjustable bracket assembly 53. When the desired position is attained, the nuts 61 are tightened to secure the bracket assembly. As shown in FIG. 7, moving the bracket assembly up or down has a much less effect on the lowered position of the dock leveler than if the length of the cylinder had been adjusted, and also allows the use of a standard non-adjustable cylinder. This technique of adjustment is preferred for use with vertical storing dock levelers than for bridges because it allows the use of a standard non-adjustable cylinder which is used in standard dock levelers.

Referring now to FIG. 2, additional construction details of the invention are depicted. A mechanical lock is used to prevent the bridge from lowering accidentally in the case of a failure of a hydraulic system used to actuate the cylinder 4. FIG. 2 illustrates a preferred toggle mechanism which can be released under load. Other techniques of mechanical locking require that the bridge be rocked to a vertical position so that a latch can be released. The mechanism described in FIG. 2 can be released even if the bridge is off vertical, that is, with the lock under load.

As illustrated in FIG. 2 the toggle lock comprises an upper arm 10 and a lower arm 11. The upper arm is attached to brackets 12 on the bridge by means of a pin 13. The upper arm is attached to the lower arm by means of a coupling pin 14. The lower arm 11 has a threaded end 15, which passes through a pivot shaft 16 as secured by means of nuts 17, 18. This threaded adjustment is used to match the adjustment of the cylinder. A pivot shaft 16 is carried on brackets 19, which are a part of brace assembly 20. The brace assembly 20 comprises a series of members which, as illustrated in FIG. 2, are secured to the bridge foundation.

A spring 21 is coupled at one end to the underside of the deck 1 and at its other side to the lower arm 11 of the lock toggle assembly. By this positioning, the spring 21 tension increases as the bridge is raised insuring that the lock will engage securely. This occurs because the lower arm 11 carries a cross member 84 which engages the upper arm 10 and prevents further rotation of the members 10 and 11 relative to each other about the pin 14. Thus, in the position illustrated in FIG. 2, arms 10 and 11 are in alignment with each other and lock together by means of member 84. In that position, a limit switch 22 senses the position of the lock toggle and actuates a light or other device to indicate that the bridge is in a safe locked condition. The toggle lock is typically released either by a pull chain, electric solenoid, push member or the like, which causes the two arms to be out of alignment, that is, with the toggle over-center which thus allows the bridge to fall. This invention, one aspect, improves the performance of such bridges to make it easier to lower.

Generally, lift bridges are raised hydraulically utilizing the cylinder 4, as illustrated in FIG. 1 (omitted from FIGS. 2–4). Such a bridge however, is generally lowered by gravity. Typically, the mechanical lock is released and oil in the hydraulic cylinder associated with member 4 is allowed to drain back to a reservoir through a valve (not shown), which controls the lowering speed. That is, the cylinder acts as a brake. However, when the bridge is stored in a near vertical position as illustrated in FIG. 1, the weight moment of inertia of the bridge itself about the hinge 2 is very small. Thus, the bridge begins to move initially very slowly. In accordance with this invention, an hydraulic cylinder is employed which, at the same time, releases the mechanical lock and rotates the bridge forward under power to a position where gravity can have a greater effect on the bridge. Such is illustrated in FIGS. 2, 3 and 4.

A release arm assembly 25 is pivoted on pin 13. The arm has a surface which bears on a pin 85 carried by the upper arm 10. An hydraulic cylinder 26 is attached to the arm assembly 25 by means of a pin 27. It is pivoted to the deck 1 by means of a pivot 29 carried on brackets 28.

Referring now to FIG. 3, the operation of the device will be explained. When it is desired to lower the bridge 1, the hydraulic pump is started and the cylinder 26 extends its piston element causing the arm assembly 25 to pivot about point 13, and given the contact on pin 85, urge arm member 10 outward. This outward movement causes a pivot about pin 14 with the result that the arms 10 and 11 disengage and the unit is thus free to fall. In a conventional device once the limit switch 22 has determined that the arm 11 is free the hydraulic pump then stops. The unit thus falls by gravity. As illustrated in FIG. 3, a second limit switch 30 is placed so that it engages until the bridge is far enough forward, that is, has rotated clockwise to a point where it may fall freely by gravity. Until that point is reached the hydraulic pump continues to be actuated and the cylinder 26 urges the arm assembly 25 against the pin 85 on the upper arm assembly 10. This is illustrated in FIG. 3. The upper arm 10 pulls on the lower arm 11 forcing the bridge to rotate in a clockwise direction. When the bridge has rotated to the point where it may fall freely by gravity the limit switch 30 causes the pump to turn off.

FIG. 4 illustrates the bridge and lock mechanism when the deck 1 is in the fully lowered position. As illustrated in that figure the arm assembly 25 remains in its extended position but the upper and lower arms have collapsed about a pin 14 so that no longer is the arm assembly 25 in engagement with pin 85. A limit switch, not shown, may be used to determine when the deck is fully lowered.

Referring back to FIG. 1 a second aspect of this invention will now be explained. As illustrated in that figure, the hydraulic cylinder 4 is placed so that the greatest lifting moment about the bridge hinge 2 is generated when the bridge is lowered from the vertical position. A reduced lifting moment is produced when the bridge is raised. This is done by matching the lifting moment of the cylinder to the moment about the hinge caused by the weight of the bridge, and also, to minimize the amount of space occupied when the bridge is raised.

As illustrated in FIG. 1 the moment of the weight of the bridge about the hinge 2 is $M = W*a_1$ where W is the weight of the bridge and $a_1$ is the distance from the hinge point to the center of gravity of the bridge when lowered. The force F required from the hydraulic cylinder is $F = M/b_1$ where $b_1$ is the distance from a line through the axis of the cylinder to a parallel line passing through the bridge hinge. These distances are all illustrated in FIG. 1.

The distance from a line passing through the bridge hinge $a_2$ is the distance to a line passing through the center of gravity of the bridge in its raised position and the distance $b_2$ is the distance from the cylinder to the bridge hinge in the raised position determined by parallel lines as in the case of 6. As is apparent from FIG. 1, when the bridge 1 is raised $a_2$ is less than $a_1$. Thus, $b_2$ can be less than $b_1$ without requiring that the cylinder force increase. However, the reduction of the moment arm of the hydraulic cylinder about the bridge hinge from $b_1$ to $b_2$ causes the rotational speed of the bridge to increase as it is raised. This occurs because the rate of extension of the hydraulic cylinder 4 is essentially constant.

As the moment arm decreases the rotational speed increases. The increased speed and reduced moment arm of the cylinder can result in high forces on the hydraulic cylinder and the bridge hinges when the bridge stops abruptly as the cylinder reaches the end of its stroke and the bridge is in the vertical stored position, illustrated in FIG. 1. This can also cause the bridge to rock violently in that vertical position. Given this problem, speed limits at which the bridge is raised are usually imposed during such operations. In theory, the cylinder extension speed could be varied by varying the hydraulic pump speed, or by employing variable flow valves. Such methods are generally expensive to implement, and introduce additional complications into the system.

In accordance with this invention the lift bridge employs an hydraulic cushion at the end of the cylinder extension stroke. This controls the abrupt stopping of the cylinder to prevent rocking. Reference is made to FIGS. 5 and 6, which illustrate this cushion cylinder arrangement. The hydraulic cylinder 4 comprises a cylinder body 40 having a rod 41 and a piston 42. The head of the cylinder 43 is elongated and a plug 44 having a diameter slightly larger than that of the cylinder rod 41 is fitted on the cylinder rod just ahead of the piston 42. To extend the cylinder hydraulic fluid is pumped into the cylinder cavity 45. Given the O-ring seal illustrated in the piston 42 fluid isolation is maintained across the piston. As hydraulic fluid is pumped into the cylinder cavity 45 the rod extends and the piston moves to the right. Hydraulic fluid in the cavity to the right of the piston exits through annular passage 46 into the exit port 47 where it is recycled in a reservoir, not illustrated.

As the cylinder rod 41 approaches the end of the stroke, as illustrated in FIG. 6, the plug 44 enters the annular cavity 46 and blocks further fluid flow. A small passage 48 is created in the cylinder by wall member 51. Fluid is still free to flow through the passage 48, which has a needle valve 49 in the fluid path. The needle valve controls the rate of fluid flow from the passage 48 into the passage 46 for exit into the port 47. Thus, the cylinder velocity is limited by the rate at which fluid can pass through the restricted passage 48 and the needle valve 49. With this technique the cylinder can be extended at a higher rate to raise the bridge but can then be decelerated at the end of travel at a controlled rate.

Moreover, the plug 44 can be slightly tapered, as illustrated in FIGS. 5 and 6, so that deceleration begins gradually as the bridge nears the end of its travel. That is, as the plug 44 enters the passage 46 there will be some leakage or fluid flow in the passage until complete stoppage occurs and then fluid flow is limited only to that in the restricted passage 48.

It is apparent that modifications of this invention may be practiced without departing from the essential scope thereof.

I claim:

1. Apparatus for spanning a distance between spaced objects at least one of which is stationary, said device movable from a generally vertical stored position to a generally horizontal operative position comprising:
a deck hingedly connected to said stationary object,
means for raising said deck from said operative position to said inoperative position,
lock means for holding said deck in said inoperative position, and
means mounted on said deck for contacting said lock means for releasing said lock means thereby permitting said deck to be lowered said means mounted on said deck moving in contact with said locking means additionally for urging said deck to rotate toward said operative position.

2. The device of claim 1 wherein said lock means comprises a toggle arm assembly, a first arm pivotally mounted to said deck and a second arm pivotally mounted to said stationary object, said first and second arms pivotally coupled to each other, and stop means on one of said arms to lock said arms into alignment with each other.

3. The device of claim 2 wherein said means associated with said lock means comprises a kick-out arm mounted to engage said lock means and pivot one of said arms relative to the other to release said lock means, and means for moving said kick-out arm to engage one of said arms of said lock means and rotate said deck.

4. The device of claim 3 wherein said means for moving said kick-out arm comprises an hydraulic cylinder mounted to said deck and to said kick-out arm and extensible to cause said deck to rotate by movement of one of said arms of said lock means.

5. The device of claim 2 further comprising spring means to bias said lock means into alignment with each other.

6. The device of claim 1 further comprising sensor means to determine whether said lock means is engaged to hold said deck in said inoperative position.

7. The device of claim 1 wherein said means for raising said deck comprises an hydraulic cylinder and an extensible piston in a cavity of said cylinder dividing said cavity into two chambers, further including means to vary the flow rate of said hydraulic cylinder at the end of piston extension to decelerate movement of said deck as it approaches said inoperative position.

8. The device of claim 7 wherein said means to vary the flow rate comprises an extension at one end of said cylinder, an exit port, a fluid return path in said extension coupled to said exit port, means in said cylinder to close said fluid return path and an adjustable fluid bypass between said cylinder cavity and said exit port.

9. The device of claim 8 wherein said adjustable fluid bypass comprises a channel in fluidic contact with one of said chambers and a needle valve in said channel to adjust the fluid flow therein to said exit port.

10. The device of claim 7 wherein said means to vary the flow rate comprises a tapered section on said piston, a fluid return path in said cylinder and, said tapered section engaging said fluid return path as said piston extends from said cylinder to gradually reduce fluid flow and thereby decelerate movement of said piston.

11. Apparatus for spanning a distance between spaced objects at least one of which is stationary, said device movable from a generally vertical stored position to a generally horizontal operative position comprising:

a deck hingedly connected to said stationary object,
hydraulic means for raising said deck from said operative position to said inoperative position,
lock means for holding said deck in said inoperative position,
means mounted on said deck for contacting said lock means for releasing said lock means thereby permitting said deck to be lowered said means mounted on said deck moving in contact with said locking means additionally for urging said deck to rotate toward said operative position, and means in hydraulic fluid communication with said hydraulic means for hydraulically slowing movement of said deck as it approaches said inoperative position.

12. The device of claim 11 wherein said hydraulic means comprises a piston and cylinder assembly connected between said deck and said stationary object, said piston dividing said cylinder into two chambers one of which having a fluid exit port for returning fluid to a reservoir said when deck is raised.

13. The device of claim 12 wherein said means for hydraulically slowing movement of said deck comprises an extension on said cylinder, said fluid exit port in said extension and a tapered plug on said piston to gradually close said fluid exit port as said piston is extended from said cylinder to raise said deck.

14. The device of claim 12 wherein said means for hydraulically slowing movement of said deck comprises an auxiliary channel in fluid communication with said fluid exit port and a valve in said auxiliary channel whereby as said deck is raised fluid flow from said cylinder to said exit port passes through said auxiliary channel at a flow rate decreasing as said deck approaches said inoperative position.

15. The device of claim 11 further comprising lock means for holding said deck in said inoperative position and means associated with said lock means for releasing said lock means and urging said deck to rotate toward said operative position.

16. The device of claim 15 wherein said lock means comprises a toggle arm assembly having a pair of arms, one arm pivotably mounted to said deck and the other arm pivotably mounted to said stationary structure with said arms pivotably connected to each other and a stop member on one of said arms to lock said arms into alignment with each other.

17. The device of claim 16 wherein said means associated with said lock means comprises a kick-out arm mounted to engage said lock means and pivot one of said arms relative to each other to release said lock means, and means for moving said kick-out arm to engage one of said arms of said lock arms and rotate said deck.

* * * * *